United States Patent Office 3,454,535
Patented July 8, 1969

3,454,535
FILAMENTS, THREADS AND FIBERS OF POLY-
AMIDES FROM N-MONO-(SULFONALKYL)-AL-
KYLENEDIAMINE
Ferdinand Bodesheim and Günther Nawrath, Dormagen, and Günther Nischk, Leverkusen, Germany, assignors to Farbenfabriken Bayer Aktiengesellschaft, Leverkusen, Germany
No Drawing. Filed Jan. 21, 1965, Ser. No. 427,099
Claims priority, application Germany, Feb. 8, 1964,
F 41,967
Int. Cl. C08g 20/20
U.S. Cl. 260—78                     9 Claims

ABSTRACT OF THE DISCLOSURE

Condensation of N-mono - (sulfonalkyl) - alkylenediamine or salt with alkylene dicarboxylic acid in the presence of a polyamide-forming material such as a lactam or salt of diamine and dicarboxylic acid, at a temperature between about 250–300° C., in which such sulfonalkyl-alkylenediamine acid or salt is present in an amount between about 0.1–25% by weight of the polyamide-forming material, to form the corresponding sulfonic acid group-containing melt-spinnable polyamide; and filaments, fibers and threads produced by melt-spinning such polyamide.

This invention relates to filaments, threads and fibres from polyamides containing sulfonic acid groups linked to a $C_4$ to $C_6$ alkyl group and to the manufacture of said filaments, threads or fibers.

In the polycondensation of ammonium salts of diamines with dicarboxylic acids or in the polymerisation of lactams, more or less high molecular polyamides are produced the water uptake of which at room or elevated temperature depends on the number of C-atoms and hetero-atoms in the monomer unit. Thus, for example, the polyamide of hexamethylene diamine and sebacic acid has a lower uptake capacity than the polyamide of hexamethylenediamine and adipic acid or caprolactam. The hydrophilic properties may further be increased by the incorporation of ammonium salts which contain hetero-atoms, such as oxygen. Suitable starting components for this purpose are, for example, ammonium salts of ether dicarboxylic acid or ether diamines, e.g. γ,γ′-di(aminopropoxy)-butane (-ethane, -hexane) or the corresponding γ,γ′-di(carboxypropoxy)-alkylenes.

In relation to dyeing with basic dyestuffs it has also been proposed to incorporate into the polyamides by condensation, small percentages of alkali metal salts of aromatic diaminosulphonic acids, e.g. salts of 2:6-bis(aminomethyl)-4-methyl-benzenesulphonic acid.

It has now been found that hydrophilic threads and fibers which can be dyed with basic dyestuffs are obtained when a N:N-sulfonalkyl-alkylenediamine of the formula

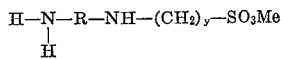

wherein R is an alkylene group having 2 to 12 C-atoms or a cycloalkylene group, y a whole number from 4 to 6 and Me hydrogen or an alkali metal together with approximately equivalent quantities of alkylene dicarboxylic acids or their alkali metal salts are incorporated by condensation in quantities of 0.1 to 25%, preferably 2 to 10%, in the known polyamides such as are obtained, for example, by polymerisation of the lactams or condensation of diammonium salts or diamines with dicarboxylic acids, and the resulting polyamides are spun from the melt to form fibers or threads.

These polyamides, i.e. saturated aliphatic polycarbon-amides, contain up to 25 percent of a recurring unit of the formula

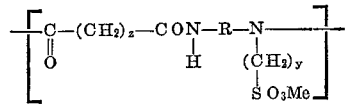

wherein R represents a member of the group consisting of an alkylene having 2 to 12 C-atoms and a cycloalkylene, y is a whole number from 4 to 6, z is a whole number from 4 to 9 and Me is a member of the group consisting of hydrogen and an alkali metal, such that for example —$(CH_2)_y$— may be butylene, pentylene or hexylene and R may be a cycloalkylene of the formulae

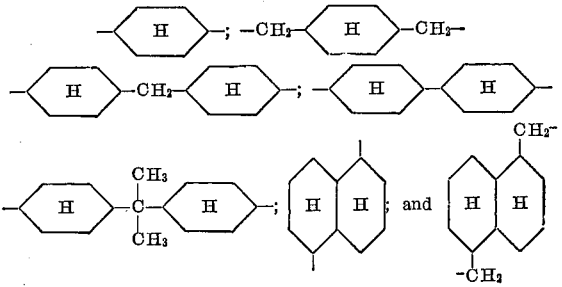

e.g. cycloalkylene groups having 6 to 15 carbon atoms.

The mono-sulphoalkylalkylenediamines or the corresponding cycloalkenediamines are obtainable by, for example, reacting alkylenediamines such as ethylene-, propylene-, tetramethylene-, hexamethylene-, octamethylene-, decamethylenediamine or cycloalkyldiamines such as hexahydro - p - phenylendiamine, 1,4-diaminomethylcyclohexane, 4,4′ - diaminocyclohexylmethane, 4,4′ - diaminocyclohexyl-dimethylmethane, 4,4′ - diaminodicyclohexane, 1,5-diaminodecaline and 1,5-diamino-methyldecaline with two mols of butanesultone-1:4, pentanesultone-1,5 or their C-alkylsubstitution products. In the reaction, the products are obtained as inner ammonium salts. In the polymersation or polycondensation of the known starting materials for polyamides, either the inner ammonium salts thus obtained are used in conjunction with mono- or di-alkali metal salts of dicarboxylic acids or the inner ammonium salts of the sulphonic acids are first converted into the corresponding alkali metal salts which are then condensed in the presence of free dicarboxylic acids.

The following dicarboxylic acids may be used: succinic-, adipic- and sebacic acid. To obtain high molecular weight polyamides suitable for spinning, it is advantageous to use the sulpho group-containing monomers with the dicarboxylic acids in equivalent quantities.

For the process of polycondensation, the abovementioned monomers together with the corresponding quantity of dicarboxylic acid or the corresponding alkali metal salt are added to the known starting products for the perparation of polyamide in quantities of 0.1 to 25% or 0.1 to 20%. The addition may be carried out by adding the monomers with the dicarboxylic acids or their alkali metal salts in solid form or, in accordance with an especially advantageous feature, the equivalent quantities of the monomers and dicarboxylic acids or their salts are dissolved in water and then added to the usual polyamide reaction components. The monomers are thus very finely divided in the polyamide melt so that rapid and uniform incorporation by condensation is achieved. In this process, the melt, which at first turbid, becomes completely clear at elevated temperatures after a certain time has expired.

Compounds used as starting materials for the known polyamides which are modified in accordance with the invention are lactams such as caprolactam and ω-aminocarboxylic acids such as ε-aminocaproic acid, 11- aminoundecanoic acid and the diammonium salts of alkylene diamines with dicarboxylic acids. Examples of the last mentioned are: tetra-, hexa- and octa-methylenediamine with adipic-, suberic- and sebacic acid.

The condensation is carried out at temperatures above the melting point of the polyamides, preferably between 250 and 300° C. If condensation is not carried out under pressure, inert gases such as nitrogen or carbon dioxide, which should be as far as possible free from oxygen, should be passed over the melt. If caprolactam is used in the preparation of the new polyamides, it is advantageous to carry out an extraction with water before the melt spinning, in order to remove monomeric lactam.

The new polyamides are then spun into filaments, threads or fibers by the melt spinning process. Owing to their greater water uptake, they have a substantially more hydrophilic character than the unmodified starting polyamide. Owing to the aliphatic structure of the new monomers which contain sulphonic acid groups, the polyamides obtained are more fast to light, especially since they contain no autooxidisable ether oxygen atoms, and they can easily be dyed with basic dyestuffs. In addition, they are more stable than the corresponding components in which the sulphonic acid group is attached to the aromatic nucleus since in such components, as is known, the sulphonic acid group is in many cases split off by the action of water at elevated temperatures. The melting points of the modified polyamides, especially when 2 to 10% of the components which contain sulphonic acid groups are incorporated by condensation, do not differ substantially from the corresponding unmodified polyamide types.

In the following examples which illustrate the invention the parts are parts by weight:

EXAMPLE 1

60 parts of an aqueous solution containing 252 parts of N-sulphobutyl-hexamethylenediamine and 168 parts of monosodium adipate in 2500 parts of water are added to 170 parts of caprolactam and 20 parts of ε-aminocaproic acid. After dewatering for one hour at 150° C., condensation is carried out under carbon dioxide for 3 hours at 250° C. and 2 hours at 270° C. After extraction, the polyamide obtained has a melting point of 214 to 216° C., a relative viscosity of 3.08, a melt viscosity of 8180 P. and a polymerisation tendency of +13.4%.

From this product, threads which have a good water uptake capacity and can be dyes with basic dyestuffs can be spun at a spinneret temperature of 275° C. and draw off speed of 650 m./min.

EXAMPLE 2

120 parts of the aqueous solution mentioned in Example 1 are added to 160 parts of caprolactam and 20 parts of ε-aminocaproic acid. After one hour's dewatering at 150° C., condensation is carried out under nitrogen at 265° C. for 5 hours. After extraction, the resulting polyamide of melting point 208 to 210° C. has a relative visocity of 2.35, a melt viscosity of 2270 p. and a polymerisation tendency of +45.8%. The granulate obtained is spun from the melt to form threads as in the above examples.

EXAMPLE 3

93 parts of 11-amino-undecanoic acid are combined with 42 parts of the solution described in Example 1 and condensed in a stream of nitrogen at 275° for 5 hours after one hour's dewatering at 150° C. The resulting polyamide has a melting point of 183 to 186°. After spinning from the melt, considerably more hydrophilic threads are obtained than from the polyamide of 11-amino-undecanoic acid. They have a good water uptake capacity and improved dyeability with basic dyestuffs.

EXAMPLE 4

80 parts of the salt of sebacic acid and hexamethylene diamine are treated with 20 parts of an equimolecular mixture of disodium adipate/adipic acid and N-sulphobutylhexamethylenediamine and then condensed in a vacuum for 6 hours at 250° C. The colourless polyamide is formed with splitting off of water. It is spun into a rod which is then cut up into small pieces. These small pieces obtained are then heated to 240° C. and spun to a thread at a draw-off speed of 700 m./min. The affinity to basic dyestuffs is good. The hydrophilic properties are also substantially improved.

EXAMPLE 5

180 parts of caprolactam and 10 parts of ε-aminocaproic acid are combined with 10 parts of a mixture consisting of 73 parts of adipic acid and 136 parts of the sodium salt of N-(4-aminohexyl)-4-aminobutane sulfonic acid. The pure colorless melt is condensed at 280° C. for 6 hours under nitrogen. After extraction, the polyamide obtained has a melting point of 214–216° C. and a relative viscosity of 2.68.

The obtained product is spun at a spinneret temperature of 268° C. and draw off speed of 600 m./min. to threads having an improved dyeability to basic dyestuffs.

EXAMPLE 6

95 parts of the salt of hexamethylenediamine and adipic acid are condensed with 5 parts of a mixture consisting of 173 parts of N-(4-sulfobutyl)-4,4'-diamino-dicyclohexylmethane and 84 parts of sodium adipate in vacuum at 305° C. for 5 hours under nitrogen after formation of the prepolymer. The polymer obtained melts at 243–245° C. and has a relative viscosity of 2.57. At a spinneret temperature of 275° C. and draw off speed of 650 m./min. polymer threads having improved hydrophilic properties and dyeability to basic dyestuffs are obtained.

EXAMPLE 7

91 parts of a mixture consisting of 27 parts of 1:1- and 64 parts of 1:2 adduct of 4,4'-diamino-dicyclohexylmethane and butane soltone are solved in 150 parts of water and combined with 13.2 parts of caustic soda and 31.2 parts of adipic acid. A pale yellow pure solution is obtained. 10.5 parts of this solution are combined with 185 parts of caprolactam and 10 parts of ε-aminocaproic acid. When condensing for 6 hours under nitrogen at a temperature of 270° C. a polyamide having a melting point of 216° C. and a relative viscosity of 2.72 is obtained. The polyamide is melt at a temperature of 265–270° C. and spun as a monofil or thread from a nozzle at a draw off speed of 650 m./min.

EXAMPLE 8

21 parts of the solution described in Example 7 are condensed with 80 parts of caprolactam and 10 parts of ε-aminocaproic acid according to Example 7. The obtained polymer has a relative viscosity of 2.58 and a melting point of 212–214° C. The resulting polyamide is spun according to Example 7.

What we claim is:

1. A filament of a polyamide constituting a saturated aliphatic polycarbonamide having 0.1 to 25 percent of a recurring unit of the formula

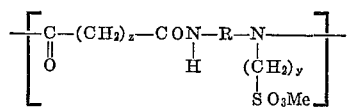

wherein R represents a member of the group consisting of an alkylene having 2 to 12 C-atoms and a cycloalkylene, $y$ is a whole number from 4 to 6, $z$ a whole number from 4 to 9 and Me a member of the group consisting of hydrogen and an alkali metal.

2. Polyamide constituting a saturated aliphatic polycarbonamide having 0.1 to 25 percent of a recurring unit of the formula

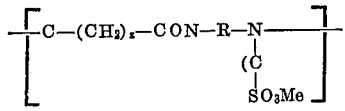

wherein R represents a member of the group consisting of an alkylene having 2 to 12 C-atoms and a cycloalkylene, y is a whole number from 4 to 6, z a whole number from 4 to 9 and Me a member of the group consisting of hydrogen and an alkali metal.

3. Polyyamide according to claim 2 wherein R is cycloalkylene having 6 to 15 carbon atoms.

4. Process for the production of polyamides constituting saturated aliphatic polycarbonamides having sulfonic acid groups which comprises condensing at a temperature between about 250–300° C. a sulfonalkylalkylenediamine of the formula

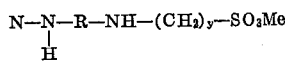

wherein R represents a member of the group consisting of an alkylene having 2 to 12 C-atoms and a cycloalkylene, y a whole number of 4 to 6 and Me a member of the group consisting of hydrogen and an alkali metal, together with an alkylene dicarboxylic acid having 4 to 9 C-atoms in the alkylene moiety in the presence of a polyamide-forming starting material, selected from the group consisting of a lactam and a salt of a diamine and a dicarboxylic acid, the amount of the sulfonalkylalkylenediamine being in the range of 0.1 to 25 percent by weight of the polyamide, whereby to form such polyamide products.

5. Process according to claim 4 wherein said alkylene dicarboxylic acid is used in the form of its alkali metal salt and Me is hydrogen.

6. Process according to claim 4 wherein R is cycloalkylene having 6 to 15 carbon atoms.

7. Process according to claim 4 wherein caprolactam is used as polyamide-forming material and the resulting polyamide is extracted with water before melt spinning.

8. Process according to claim 4 wherein the amount of the sulfonalkylalkylenediamine is in the range of 0.1 to 20% by weight of the polyamide.

9. Process according to claim 8 wherein said alkylene dicarboxylic acid is used in the form of its alkali metal salt and Me is hydrogen.

References Cited

UNITED STATES PATENTS

| | | | |
|---|---|---|---|
| 3,039,990 | 6/1962 | Huffman | 260—78 |
| 3,142,662 | 7/1964 | Huffman | 260—78 |
| 3,184,436 | 5/1965 | Magat | 260—78 |
| 3,296,204 | 1/1967 | Caldwell | 260—78 |

HAROLD D. ANDERSON, *Primary Examiner.*

U.S. Cl. X.R.

8—55

UNITED STATES PATENT OFFICE
CERTIFICATE OF CORRECTION

Patent No. 3,454,535

July 8, 1969

Ferdinand Bodesheim et al.

It is certified that error appears in the above identified patent and that said Letters Patent are hereby corrected as shown below:

Column 1, line 18, after "amine" insert -- acid --; same line 18, after "dicarboxylic acid" insert -- or salt --. Column 2, line 37, "two mols" should read -- one mol --; line 68, after "which" insert -- is --. Column 3, line 50, "dyes" should read -- dyed --. Column 5, line 21, the leftmost "N-" in the formula should read -- H- --. Column 6, line 27, insert -- 2,989,364  6/1961  Goldann ------ 260-78 --.

Signed and sealed this 2nd day of June 1970.

(SEAL)
Attest:

Edward M. Fletcher, Jr.

Attesting Officer

WILLIAM E. SCHUYLER, JR.

Commissioner of Patents